United States Patent [19]

Kurei

[11] 4,293,209
[45] Oct. 6, 1981

[54] MIRROR OPERATING MECHANISM IN SINGLE LENS REFLEX CAMERA

[75] Inventor: Hiroshi Kurei, Kawagoe, Japan

[73] Assignee: Asahi Kogaku Kogyo Kabushiki Kaisha, Tokyo, Japan

[21] Appl. No.: 14,791

[22] Filed: Feb. 26, 1979

[30] Foreign Application Priority Data

Feb. 28, 1978 [JP] Japan ................................ 53-22316

[51] Int. Cl.³ ............................................. G03B 19/12
[52] U.S. Cl. .................................... 354/153; 354/55; 354/56
[58] Field of Search ...................... 354/55, 56, 59, 153

[56] References Cited

U.S. PATENT DOCUMENTS

| | | | |
|---|---|---|---|
| 2,952,197 | 9/1960 | Goshima | 354/153 |
| 3,332,331 | 7/1967 | Mandler | 354/55 |
| 4,110,765 | 8/1978 | Miyata et al. | 354/59 |

Primary Examiner—John Gonzales
Attorney, Agent, or Firm—Sughrue, Mion, Zinn, Macpeak and Seas

[57] ABSTRACT

A mirror operating mechanism in a single lens reflex camera having a first reflecting mirror which is provided to swing from the view finder observation position to the photographing retraction position. A second reflecting mirror introduces light passed through the first reflecting mirror at the finder observation position to a light measuring element. The second reflecting mirror is mounted swingably on the first reflecting mirror. The second reflecting mirror has a rotary shaft around which the second reflecting mirror can swing. Both ends of the rotary shaft are rotatably mounted on both sides of a frame supporting the first reflecting mirror. The end portion of an operating arm of the second reflecting mirror is brought into contact with a cam fixedly secured to a stationary member by means of a spring.

8 Claims, 2 Drawing Figures

MIRROR OPERATING MECHANISM IN SINGLE LENS REFLEX CAMERA

BACKGROUND OF THE INVENTION

A variety of techniques have been utilized concerning the arrangement of a light measuring element in a single lens reflex camera.

In one of these techniques, the light measuring element is disposed at the lower position in the camera mirror box, the finder observing main mirror is a half mirror or has a transparent portion, and a sub-mirror is provided to reflect a part of the light beam from the photographing lens after it passes through the main mirror. This will introduce the reflected light beam to the light measuring element. The advantage of this construction resides in the light measurement value that is not significantly affected by the backward incident light from the finder. However, in this light metering method, both the main mirror and the sub-mirror must be retracted in photographing, and accordingly the resulting mirror retracting mechanism of this prior art technique is necessarily intricate.

SUMMARY OF THE INVENTION

Accordingly, an object of this invention is to provide a mirror operating mechanism which is much simpler in construction than the conventional one.

It is another object of this invention to provide a mirror operating mechanism in a single lens reflex that is reliable in operation yet easily integrated into the camera system.

These and other objects of this invention are accomplished in a mirror operating mechanism in a single lens reflex camera (SLR) having first and second reflecting mirrors. The first reflecting mirror is provided to swing from a view finder observation position to the photographing retraction position. The first mirror has a light transmitting portion and the second reflecting mirror introduces light passing through the first mirror to a light measuring element. The second reflecting mirror swings about a rotary shaft with both ends of the rotary shaft being rotatably mounted on both sides of a frame supporting the first reflecting mirror. The end portion of an operating arm of the second reflecting mirror is brought into contact, by means of a spring, with a cam fixedly secured to a stationary member.

One preferred embodiment of this invention will be described with reference to the accompanying drawings.

DESCRIPTION OF THE PREFERRED EMBODIMENT

Figure 1:
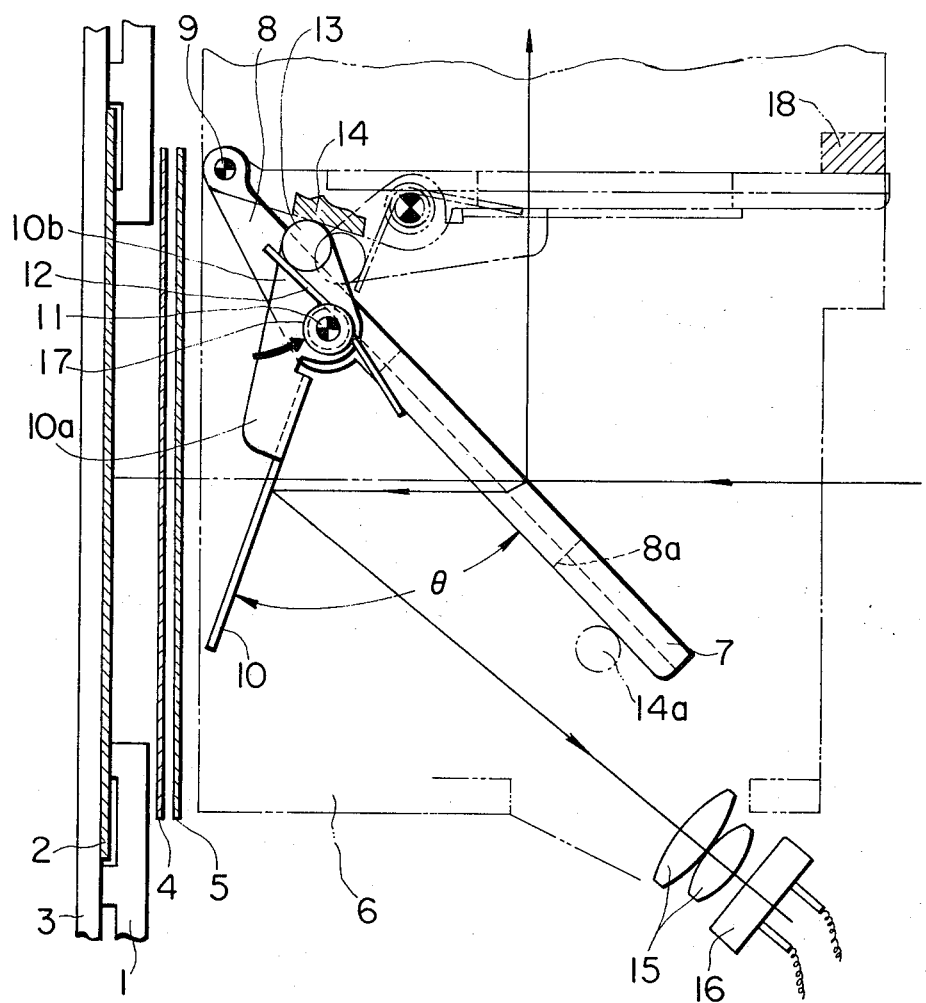
FIG. 1 is a side view showing a mirror elevating mechanism.
Figure 2:
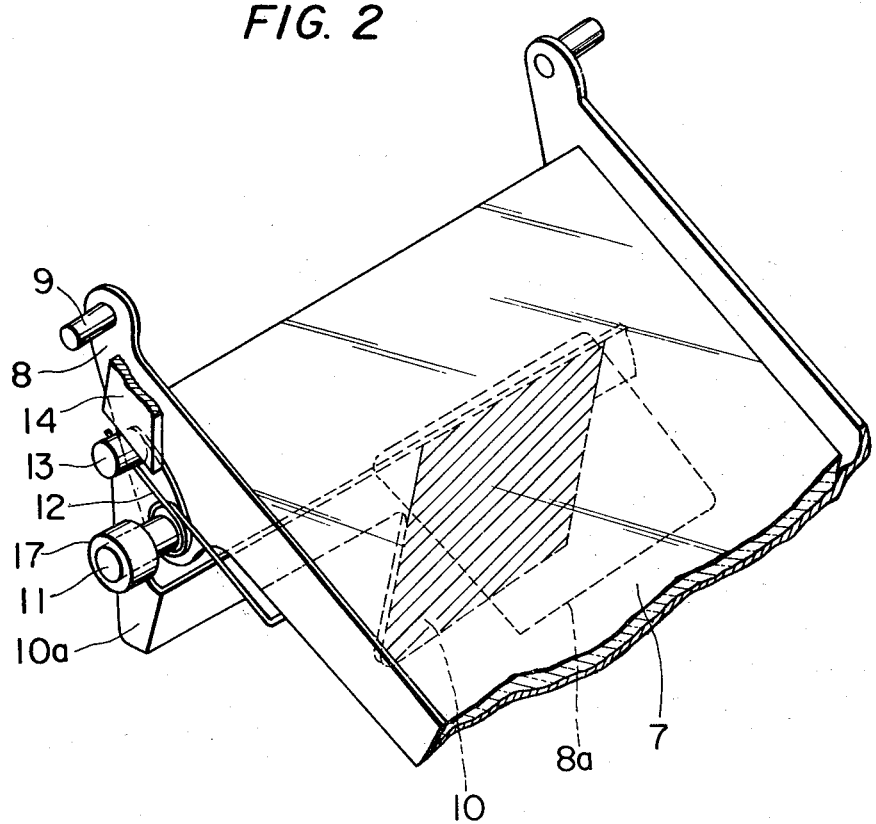
FIG. 2 is a perspective view showing the mirror elevating mechanism.

In FIGS. 1 and 2, reference numeral 1 designates a camera body and reference numeral 2, is a photographing film flush against a film depressing plate 3. The top curtain of a focal plane shutter 4 is disposed behind the bottom curtain 5. A mirror box 6 contains a main mirror 7 fixedly secured to a mirror holder 8. A rotary shaft 9 fixedly secured to the mirror holder 8 is pivotally connected to the mirror box 6. A sub-mirror 10 has operating arms 10a which are rotatably mounted on a shaft 11 (the opposite end not shown) in such a manner that they are by the sides of the mirror holder 8.

A torsion spring 12 is mounted on the shaft 11 in such a manner that an opening angle formed by the mirror holder 8 and the sub-mirror 10 is increased. More specifically, one end portion of the spring 12 is hooked onto the mirror holder 8, and the other end portion 10b thereof is hooked onto the operating arm 10a of the sub-mirror. One end portion of one of the operating arms 10a is extended to provide a pin 13 fixedly thereon.

The pin 13 abuts against a cam plate 14 due to the elastic force of the spring 12 acting on the pin 13. The cam plate 14 is stationary during operation since it is fixedly mounted on the mirror box. However, the position of the cam plate 14 relative to the pin 13 can be adjusted by pre-selecting the position of attachment of the cam plate 14 to the mirror box. Thus, the cam plate 14 is adjustable in the sense that the configuration of the cam surface which is in contact with the pin 13 is variable. Since the pin 13 abuts against the cam plate 14 as described above, the mirror holder 8 is turned clockwise as viewed in FIG. 1 until it abuts against a pin 14a fixedly secured to the mirror box 6. Finally the mirror holder 8 is stopped at the finder observation position.

In the arrangement as described above, an incident light beam from the photographing lens (not shown) is reflected upwardly (as viewed in the figure) by the main mirror 7 and is introduced into the view finder. In this connection, since the main mirror 7 has a half mirror portion or it has a central transparent part, a part of the incident light beam is allowed to pass through the main mirror 7. The mirror holder 8 has an opening 8a corresponding in position to the half mirror portion or central transparent part of the main mirror 7. The size of the opening 8a is such that it is closed by the sub-mirror 10 when the mirror is elevated. Accordingly, the light beam passing through the main mirror reaches the sub-mirror 10. In this case, since the sub-mirror 10 is a diffusion reflection surface (indicated by the oblique lines in FIG. 2), the incident light beam being subjected to diffusion reflection is condensed by a condenser lens 15 at the lower position in the mirror box and is then applied to a light measuring element 16.

The cam configuration of the above-described cam plate 14 is set under the following conditions. First, the abutment of the pin 13 against the cam is set so that, when the main mirror 7 is set at the view finder observation position, the incident light beam is directed toward the light measuring element. Then, the abutment of the pin 13 against the cam is set so that, when the main mirror 7 is at the elevated position (indicated by the two-dot chain lines in FIG. 1), the sub-mirror 10 is in close contact with the mirror holder 8. The cam configuration obtained by connecting the above-described two positions is not limited, and all that is required is to provide a cam configuration that will not impede the elevation of the main mirror and the sub-mirror. Thus, the degree of freedom in design is increased.

In operation, upon camera shutter release operation, a roller 17 placed over the shaft 11 in the direction of the arrow shown in FIG. 1 by a usual mirror operating mechanism. Therefore, the mirror holder 8 is turned around the rotary shaft 9 to the elevated position indicated by the two-dot chain lines while energizing the spring, and finally the mirror holder 8 is abutted against a stopper and stopped thereby. In this operation, the pin 13, fixed to the end portion 10b of the operating arm 10a of the sub-mirror 10, abuts against the cam plate 14 fixedly mounted on the mirror box, while the rotary shaft 11 of the sub-mirror 10 is turned around the rotary shaft 9. Accordingly, the opening angle θ formed by the sub-mirror with the mirror holder 8 is gradually reduced. Thus, when the main mirror 7 abuts against the stopper 18 and is stopped thereby, the opening angle becomes zero, whereby the sub-mirror is brought into close contact with the mirror holder and is stopped.

When the mirror elevation is completed, an ordinary top curtain release operation (not shown) is carried out. As a result, the top curtain 4 is run, to expose the film 2. After the lapse of a necessary exposure time, the bottom curtain 5 is run and the aforementioned mirror elevating force is eliminated by a mirror restoring mechanism (not shown). Both main mirror 7 and the sub-mirror 10 are returned by the action of the spring 12.

As is clear from the above description, according to this invention, with the simple mirror operating mechanism both the main mirror and the sub-mirror are operated and these two mirrors are restored by the elastic force of a single spring. Also, the sub-mirror swinging operation caused by the retraction of the main mirror can be freely set by a cam plate. Thus, with the present invention there is a reduction of the number of parts to be assembled thus creating a significant improvement in assembly efficiency, reliability, and the like.

What is claimed is:

1. In a mirror operating mechanism in a single lens reflex camera having a first reflecting mirror swinging from a view finder observation position to a photographing retraction position, said first reflecting mirror having a light transmitting portion, and a second reflecting mirror for transmitting light passing through said first reflecting mirror at the view finder observation position to a light measuring element, said second reflecting mirror being swingingly mounted on said first reflecting mirror, the improvement comprising: a frame for supporting said first mirror, a rotary shaft around which said second reflecting mirror swings, both ends of said rotary shaft being rotatably mounted on both sides of said frame supporting said first reflecting mirror, said second reflecting mirror having an operating arm with an end portion, cam means for pre-setting the position of said second mirror relative to said first mirror in both said observation and retracted positions, said cam means being secured to a stationary member but adjustable relative thereto to individually adjust either of two pre-set points of contact between said cam means and said end portion in said observation and retracted positions, respectively, without changing the other point of contact, and a spring member for urging said end portion of said operating arm into contact with said cam means at said points.

2. A mirror operating mechanism as in claim 1, wherein said spring member is mounted on the rotary shaft of said second reflecting mirror so that said spring member tends to increase an opening angle formed by said first and second reflecting mirrors.

3. The mirror operating mechanism of claim 1 wherein said end portion is a pin member and one portion of said spring member abuts said pin and urges it into contact with said means.

4. The mirror operating mechanism of claims 1, 2 or 3 wherein said spring member is a torsion spring, one end portion of said torsion spring hooked into said frame for said first reflecting mirror and the other end of said torsion spring hooked into said operating arm for said second reflecting mirror.

5. The mirror operating mechanism of claim 4 further comprising stop means for said frame supporting said first reflecting mirror.

6. The mirror operating mechanism of claim 4 further comprising said second reflecting mirror having a diffusion reflecting surface and, a condensor lens interposed between said light measuring element and said diffusion reflecting surface.

7. The mirror operating mechanism of claim 4 wherein said light transmitting portion of said first reflecting mirror is a central transparent portion in said first reflecting mirror and said frame supporting said first reflecting mirror has an opening corresponding in position to said central transparent portion.

8. The mirror operating mechanism of claim 4 wherein said light transmitting portion of said first reflecting mirror is a half mirror portion in said first reflecting mirror and said frame supporting said first reflecting mirror has an opening corresponding in position to said half mirror portion.

* * * * *